(12) United States Patent
Kim et al.

(10) Patent No.: US 7,534,833 B2
(45) Date of Patent: May 19, 2009

(54) RADIAL MULTI-BLOCK COPOLYMER CONTAINING TAPERED BLOCK, AND PREPARATION METHOD AND USAGE THEREOF

(75) Inventors: Jong-Geun Kim, Daejeon (KR); Tae-Yi Kang, Daejeon (KR); Sam-Min Kim, Daejeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 9 days.

(21) Appl. No.: 11/061,833

(22) Filed: Feb. 18, 2005

(65) Prior Publication Data

US 2005/0197463 A1      Sep. 8, 2005

(51) Int. Cl.
*C08L 53/02*    (2006.01)
(52) U.S. Cl. .............................. 525/89; 525/98; 525/271
(58) Field of Classification Search .................... 525/89, 525/98
See application file for complete search history.

(56) References Cited

U.S. PATENT DOCUMENTS

| 5,143,969 | A | 9/1992 | Reck et al. |
| 5,194,500 | A | 3/1993 | Chin et al. |
| 5,292,819 | A | 3/1994 | Diehl et al. |
| 6,534,593 | B1 | 3/2003 | Komatsuzaki et al. |
| 6,987,145 | B2 * | 1/2006 | Kim et al. ..................... 525/89 |

* cited by examiner

*Primary Examiner*—Jeffrey C Mullis
(74) *Attorney, Agent, or Firm*—Davidson, Davidson & Kappel, LLC

(57) ABSTRACT

A radial multi-block copolymer contains a tapered block as represented by the following formula 1. The radial multi-block copolymer, which includes a polystyrene block, a poly(isoprene-styrene)tapered block, a polyisoprene block, and a polybutadiene block, can be used as an excellent pressure-sensitive adhesive material.

$(pA-pT-pB)_m-X-n(pC-pB-pT-pA)$     Formula 1:

where pA is the polyvinyl aromatic block; pT is the poly(isoprene-styrene)tapered block; pB is the polyisoprene block; pC is the polybutadiene block; X is the residue of a multi-functional coupling agent used in preparation of the radial multi-block copolymer; m and n are integers equal to or greater than 1, representing the number of branches associated with X; and pT=pTA+pTB, where pTA is the pA component of pT, and pTB is the pB component of pT.

18 Claims, No Drawings

RADIAL MULTI-BLOCK COPOLYMER CONTAINING TAPERED BLOCK, AND PREPARATION METHOD AND USAGE THEREOF

BACKGROUND OF THE INVENTION

1. The Field of the Invention

This invention relates to a radial multi-block copolymer containing a tapered block. More particularly, this invention relates to a radial block copolymer that includes a polyvinyl aromatic block, a poly(isoprene-vinyl aromatic)tapered block, a polyisoprene block, and a polybutadiene block and therefore can be used as an excellent pressure-sensitive adhesive material, and a preparation method and usages thereof.

2. Related Prior Art

In general, a variety of block copolymers, such as those composed by both polystyrene and polyisoprene are used as a base resin of hot melt adhesives. Among them, the polystyrene-polyisoprene block copolymer having a relative good balance of price and performance is in much wide use to the public.

The early polystyrene-polyisoprene block copolymer is prepared by a linear coupling method in the presence of a bi-functional coupling agent (refer to U.S. Pat. No. 5,143,969). The subsequent block copolymers are those synthesized using a multi-functional coupling agent for the purpose of expanded applications and enhanced properties, including a branched block copolymer using a tri-functional coupling agent (refer to U.S. Pat. No. 5,194,500), and radial block copolymers using a tetra-functional coupling agent (refer to U.S. Pat. Nos. 5,292,819 and 6,534,593).

The methodical diversity from linear block copolymers to branched or radial block copolymers has contributed to the enhanced properties of the block copolymers and the expansion of the applications from dippers and general adhesive tapes to packaging transparent tapes, book linings, book binders, or the like.

The radial block copolymers typically including styrene and isoprene as principal ingredients are excellent in adhesiveness in the aspect of properties but poor in tackiness and melt viscosity relative to molecular weight, resulting in a deterioration of processibility.

SUMMARY OF THE INVENTION

In an attempt to solve the problems with the radial block copolymers including styrene and isoprene as principal ingredients, the inventors of the present invention have developed a block copolymer containing a tapered block composed by both styrene and isoprene as principal ingredients and found out that the novel block copolymer is superior in processibility with enhanced properties to other block copolymers including the existing radial block copolymers, thereby completing the present invention.

It is therefore an object of the present invention to provide a novel radial multi-block copolymer excellent in processibility such as melt flow index and melt viscosity, and in properties such as adhesiveness and cohesiveness, especially good tackiness which makes the hot melt adhesive applying the radial multi-block copolymer maintain its properties, including a cohesive strength such as holding power, and have an enhanced adhesive strength such as initial tack and peel strength. The novel radial multi-block copolymer can also have an enhanced processibility due to its low melt viscosity.

It is another object of the present invention to provide a method for preparing the radial multi-block copolymer.

To achieve the objects of the present invention, there is provided a radial multi-block copolymer being represented by the following formula 1 and having a weight average molecular weight of 200,000 to 500,000:

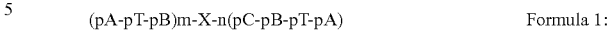

(pA-pT-pB)m-X-n(pC-pB-pT-pA)   Formula 1:

where pA is a polyvinyl aromatic block; pT is a poly(isoprene-vinyl aromatic)tapered block; pB is a polyisoprene block; pC is a polybutadiene block; X is the residue of a multi-functional coupling agent used in preparation of the radial multi-block copolymer; m and n are integers equal to or greater than 1, representing the number of branches associated with X; and pT=pTA+pTB, where pTA is the pA component of pT; pTB is the pB component of pT; pA+pTA=10 to 50 wt. %; 0.1≦pC≦10 wt. %; and 0.002≦pT≦20 wt. %.

The present invention is described in further detail as follows.

The present invention is directed to a radial multi-block copolymer that can be enhanced in application properties such as tackiness and processibility such as low melt viscosity by properly introducing a tapered block to the radial block copolymer containing a polystyrene block and a polyisoprene block. The radial multi-block copolymer is of a radial structure that combines a tri-block portion of "polyvinyl aromatic block-tapered block composed by both isoprene and vinyl aromatic monomer-polyisoprene block" and a tetra-block portion of "polyvinyl aromatic block-tapered block composed by both isoprene and vinyl aromatic monomer-polyisoprene bock-polybutadiene block".

In the radial multi-block copolymer of the present invention as represented by the formula 1, the content of the polyvinyl aromatic portion (pA+pTA) is 10 to 50 wt. % based on the radial multi-block copolymer, and pT and pC exist 0.002 to 20 wt. % and 0.1 to 10 wt. %, respectively. Preferably, the radial multi-block copolymer has a weight average molecular weight in the range of 200,000 to 500,000.

The preparation method of the radial multi-block copolymer includes the steps of:

(a) adding an initiator, randomizer, and a vinyl aromatic monomer;

(b) adding isoprene;

(c) adding a coupling agent;

(d) adding butadiene; and (e) adding a reaction terminator.

More specifically, step (a) includes polymerizing a vinyl aromatic monomer using an organolithium initiator and a polar organic compound as a randomizer in the presence of an inert hydrocarbon solvent to synthesize a living polymer.

In step (b), an isoprene monomer is added for polymerization timely before the vinyl aromatic monomer added in the step (a) is used up. As a result, a tri-block living polymer is synthesized that includes the tapered block (pT) of the polyisoprene and polyvinyl aromatic monomers and the polyisoprene block (pB) sequentially bonded to the polyvinyl aromatic block (pA) obtained in the step (a). Here, the content of pT can be readily controlled by changing the reaction temperature and the addition time of isoprene. The content of pT decreases as the addition time of isoprene is retarded after the addition of the organolithium initiator. However, the addition time of isoprene must be regulated in consideration that extremely retarding the addition of isoprene may result in exhaustion of styrene and inhibit a formation of the tapered block. Also, the addition time of isoprene must be earlier with the elevated reaction temperature.

Step (c) includes adding a multi-functional coupling agent to the tri-block living polymer obtained in the step (b) to activate a coupling reaction.

In step (d), a butadiene monomer is further added to the resultant material of step (c).

Finally, step (e) includes adding a reaction terminator to end the reaction completely.

In the preparation method of the radial multi-block copolymer, the reaction temperature is in the range of −10 to 150° C., preferably 10 to 110° C. The reaction is carried out under the pressure high enough to maintain the reaction mixture in the liquid state.

The vinyl aromatic monomer as used in the preparation of the bock copolymer of the present invention may be any vinyl aromatic monomer containing 8 to 12 carbon atoms. The specific examples of the vinyl aromatic monomer as used herein may include any one selected from the group consisting of styrene, α-methylstyrene, o-methylstyrene, or p-methylstyrene, and a mixture of at least two. Among these vinyl aromatic monomers, styrene is most preferred.

The reaction monomers as used herein include isoprene and butadiene as well as the vinyl aromatic monomer.

The inert hydrocarbon solvent for polymerization may be any known solvent for anionic polymerization. The specific examples of the inert hydrocarbon solvent as used herein may include any one selected from the group consisting of cyclohexane, cyclopentane, n-hexane, n-heptane, and a mixture of at least two. Among these inert hydrocarbon solvents, cyclohexane is most preferred.

The organolithium initiator may be any known initiator for anionic polymerization. Among the organolithium initiators, n-butyllithium is most preferred.

In addition, a polar organic compound may be used as a randomizer for improving the effect of the organolithium initiator and controlling the size of the tapered block and the content of a component caused by 1,2-addition reaction in the polyisoprene block. The specific examples of the randomizer as used herein may include tetrahydrofurane, which can be used before or in the course of the reaction. Preferably, the added amount of the randomizer is in the ranged of 0.1 to 5.0 moles with respect to 1 mole of the organolithium initiator.

The coupling agent as used herein includes a tetra-functional compound reactive to carbon-lithium bonds. The specific examples of the coupling agent may include silicon halides such as silicon tetrachloride; silanes having at least one halides substituted with an alkoxy group, such as tetramethoxysilane, or tetraethoxysilane; epoxies such as epoxidized rinsed oil, or epoxidized soybean oil; divinyls such as divinylbenzene; or epoxy silanes. Among these compounds, the preferred coupling agents used for the preparation of a radial block copolymer are silicon tetrachloride, tetramethoxysilane, or tetraethoxysilane.

The coupling rate of the tapered radial block copolymer caused by the coupling agent is represented in percentage terms and expressed as the weight ratio of the coupled polymer to the whole polymer. The term "whole polymer" as used herein is defined as the sum of coupled polymer molecules and uncoupled polymer molecules. The coupling rate is measured by GPC (Gel Permeation Chromatography).

Preferably, the polymerization reaction is performed in the oxygen- or water-free atmosphere.

The terminal of each copolymer chain exists in the living state before the polymerization terminator is added.

After the completion of the polymerization reaction, as well known in the art, water, alcohol, phenol, or an active hydrogen compound such as dicarboxylic acid is added to convert the carbon-lithium bonds of the active polymer to carbon-hydrogen bonds. Subsequently, the polymer material is isolated. The most preferred polymerization terminators are water and carbon dioxide.

A stabilizer is added to the polymer material with the polymerization terminator, and the solvent is removed using steam to produce a polymer crumb, which is then dried out with a roll mill at 110° C.

The stabilizer as used herein may include a mixture of hindered phenol-based compound and organophosphite-based compound.

The content of the vinyl aromatic (pA+pTA) in the radial multi-block copolymer of the present invention thus obtained is in the range of 10 to 95 wt. %. For the purpose of maintaining proper mechanical and application properties, the content of the vinyl aromatic is preferably in the ranged of 10 to 50 wt. %, most preferably 15 to 40 wt. %.

The weight average molecular weight of the vinyl aromatic block (pA) is in the range of, if not specifically limited to, 5,000 to 40,000, preferably 8,000 to 20,000, for the purpose of maintaining proper mechanical and application properties.

The content of butadiene (pC) in the radial multi-block copolymer of the present invention is less than 10 wt. %, preferably less than 5 wt. %.

The content of the poly(isoprene-styrene)tapered block (pT) is preferably in the range of 0.002 to 20 wt. %, more preferably 0.002 to 10 wt. %.

The weight average molecular weight of the radial multi-block copolymer of the present invention is in the range of 50,000 to 500,000, preferably 200,000 to 500,000. The coupling rate is in the range of 10 to 100%. For the purpose of maintaining balanced properties, the coupling rate is preferably in the range of 30 to 100%, most preferably 50 to 90%.

The polymer thus obtained is used as a base resin of hot melt adhesives. When applied for adhesives, the polymer is typically used together with a tackifier, an oil, and a thermal stabilizer into a hot melt adhesive, and also different types of pressure-sensitive adhesive, such as packaging tapes, labels, adhesives for hygienic products.

The adhesive composition can be prepared in the form of hot melt type as well as solvent type, and coated onto a conventional base material, such as paper, polymer film foil, non-woven fabric, or woven fabric, as well as flexible support film by roller coating, knife coating, flow coating, melt blowing, or spray method.

The composition of the present invention, which has a low melt viscosity and high shear strength, can be prepared with an extruder currently in wide industrial use.

DETAILED DESCRIPTION OF THE INVENTION

Now, the present invention will be described in further detail by way of the following Examples, which are not intended to limit the scope of the present invention.

EXAMPLE 1

This example describes a method for controlling the content of the tapered block (pT) including isoprene (IP) and styrene (SM). Cyclohexane (CHX), styrene and isoprene were used after purification for enough anionic polymerization, and n-butyl lithium (NBL) and tetrahydrofurane (THF) were added as an anionic initiator and a randomizer, respectively.

With a 10L agitation sus reactor equipped with a jacket, the polymerization reaction was carried out in the nitrogen atmosphere. During the polymerization reaction, the anhydrous reaction mixture was continuously stirred. Separately, cyclohexane with tetrahydrofurane was already added into the reactor before the addition of polymerization monomers. The reaction initiator, n-butyllithium was used in a concentration of 2M in cyclohexane.

The addition time of isoprene was varied by reaction temperature so as to control the content of the tapered block.

First, styrene was added into the reactor filled with a reaction solvent, and then an initiator was added followed by a randomizer. Subsequently, isoprene was added before the styrene was consumed completely by the reaction, to synthesize a tri-block polymer including a tapered block. The content of the tapered block with respect to the whole block copolymer was varied by changing the addition time of isoprene after the addition of the initiator and analyzed by way of NMR.

The results are presented in Table 1.

According to the following equations, the styrene content ($\rho_{pTA}$) of the isoprene-styrene tapered block can be calculated from the styrene content ($\rho_{boundPS}$) measured by NMR analysis and the sytrene content ($\rho_{blockPS}$) including the styrene block in the styrene content.

$$\rho_{pT} = \rho_{boundPS} \times \rho_{pTA} \times 2$$

$$\rho_{pTA} = 1 - \rho_{blockPS}$$

In the equations, $\rho_{pT}$ is the weight fraction of pT; $\rho_{boundPS}$ is the weight fraction of bound PS; $\rho_{pTA}$ is the weight fraction of pTA; and $\rho_{blockPS}$ is the weight fraction of block PS.

TABLE 1

Variations of Tapered Block Content (pT) According to Addition Time of Isoprene (IP)

| Reaction Temperature (° C.) | Addition Time of IP (min, after addition of NBL) | $\rho_{boundPS}$* | $\rho_{blockPS}$* | pT Content (wt. %, $\rho_{pT}$* 100) |
|---|---|---|---|---|
| 50 | 3 | 0.2 | 0.751 | 9.96 |
|  | 5 |  | 0.899 | 4.04 |
|  | 16 |  | 0.9986 | 0.056 |
| 60 | 2 |  | 0.782 | 8.72 |
|  | 3 |  | 0.8541 | 5.84 |
|  | 10 |  | 0.997 | 0.12 |
| 70 | 1 |  | 0.704 | 11.84 |
|  | 1.5 |  | 0.84 | 6.4 |
|  | 2.5 |  | 0.934 | 2.64 |
|  | 10 |  | 0.9994 | 0.0024 |

*NMR measurement results

EXAMPLES 2-A, 2-B AND 2-C

These examples describe a method for preparing a radial tri-block copolymer and a radial tetra-block copolymer containing a tapered block, and an adhesive composition.

The added amounts of the components, the addition time of isoprene, and the content of the tapered block as well as the fundamental information and adhesive properties of each sample are presented in Table 3.

Table 4 shows the analysis methods of various properties measured.

First, the tapered radial block copolymer of the present invention was prepared as follows.

Cyclohexane, styrene, isoprene and butadiene were used after purification for enough anionic polymerization, and n-butyl lithium and tetrahydrofurane were added as an anionic initiator and a randomizer, respectively.

With a 10L agitation sus reactor equipped with a jacket, the polymerization reaction was carried out in the nitrogen atmosphere. During the polymerization reaction, the anhydrous reaction mixture was continuously stirred. Separately, 5,400 g of cyclohexane with tetrahydrofurane was already added into the reactor before the addition of polymerization monomers, and the reactor was warmed to 60° C. to make the reaction ready. The reaction initiator, n-butyllithium was used in a concentration of 2M in cyclohexane, and the reaction terminator was methanol (MeOH).

For the preparation of polystyrene, 180 g of a styrene monomer was added into the reactor, and then an initiator was added followed by a randomizer to synthesize a polystyrene living polymer. 702 g of an isoprene monomer was added for polymerization before the styrene monomer was consumed completely, to synthesize a tri-block living polymer of "polystyrene block-tapered block of isoprene and styrene-polyisoprene block".

Subsequently, silicon tetrachloride (STC) was added as a coupling agent to the tri-block living polymer and 18 g of butadiene (BD) was added to synthesize a radial multi-block copolymer of tri-block and tetra-block.

A small amount of methyl alcohol was added as a polymerization initiator to the living polymer solution to deactivate the living polymer, and a stabilizer was then added. Subsequently, the solvent was removed from the polymer solution using steam to produce a polymer crumb, which was then dried out with a roll mill at 110° C.

The dry tapered radial block copolymer was used to prepare an adhesive. The ingredients of the adhesive were Wingtac 86 (commercially available from Good Year Company) as a tackifier, WT 2150 (commercially available from Michang Oil Ind. Co., Ltd.) and IRGANOX 1010 (commercially available from Ciba-Geigy Corp.). The composition and the content of the adhesive are presented in Table 2.

TABLE 2

Composition and Content of Adhesive

| Ingredients | Added Amount | Unit |
|---|---|---|
| Copolymer | 100 | phr |
| Wingtac 86 | 100 | phr |
| WT 2150 | 10 | phr |
| Irganox 1010 | 2 | phr |

The ingredients of the adhesive composition were stirred at 300 rpm and 160° C. for uniform mixture, and nitrogen was blown into the mixer continuously so as to prevent entrance of air and any chemical changes (such as decomposition or gelation) of SIS and other ingredients during the mixing step.

The adhesive composition thus obtained was transferred to a hot melt applicator preheated at 180° C. and coated onto a 38-micron thick PET film in a thickness of 20 to 25 micron to prepare an adhesive tape.

COMPARATIVE EXAMPLES 1 AND 2

In the Comparative Example 1, the procedures were performed in the same manner as described in Example 2-A, excepting that the addition time of isoprene was varied and that N,N,N,N-tetramethylethylenediamine was used instead of tetrahydrofurane as a randomizer. In addition, methanol was added to terminate the reaction right after the coupling reaction using silicon tetrachloride without adding butadiene.

In the Comparative Example 2, the procedures were performed in the same manner as described in Example 2-A, excepting that the addition time of isoprene was varied and that dimethyldichlorosilane (DCDMS) was used instead of silicon tetrachloride as a coupling agent to activate a linear coupling reaction. In addition, 135 g of styrene monomer and 765 g of isoprene were used to prepare a polymer.

TABLE 3

| Sample | Example | | | Comparative Example | |
|---|---|---|---|---|---|
| | 2-A | 2-B | 2-C | 1 | 2 |
| Polymer Structure | Radial | Radial | Radial | Radial | Linear |
| n-butyllithium Content (phm) | 0.121 | 0.112 | 0.115 | 0.131 | 0.084 |
| Addition Time of Isoprene (min, after addition of NBL) | 3 | 2 | 3 | 30 | 30 |
| STC Content (phm) | 0.038 | 0.034 | 0.038 | 0.053 | — |
| DCDMS Content (phm) | — | — | — | — | 0.064 |
| pT Content (wt. %) | 5.4 | 8.5 | 4.7 | 0 | 0 |
| Weight Average Molecular Weight | 234600 | 269300 | 257000 | 226000 | 182200 |
| Coupling Rate (%) | 64 | 66 | 71 | 74 | 82 |
| Melt Flow Index (g/10 min) | 13 | 5 | 6 | 6 | 10 |
| Ball Tack (cm) | 6 | 7 | 9 | 15 | 13 |
| Loop Tack (gf/in) | 2500 | 2570 | 2500 | 2490 | 1960 |
| 180° Peel Strength (gf/in) | 1660 | 1690 | 1600 | 1630 | 1270 |
| Holding Power (min) | >3000 | >3000 | >3000 | >3000 | 17 |
| Softening Point (° C.) | 121 | 129 | 125 | 124 | 117 |

TABLE 4

| Property | Property Analysis Method |
|---|---|
| pT Content | NMR |
| Average Molecular Weight | GPC |
| Coupling Rate | GPC |
| Melt Flow Index | ASTM D 1238 |
| Ball Tack | PSTC-6, at 23° C. |
| Loop Tack | ASTM D 6195 at 23° C. |
| Peel Strength | PSTC-1, 180° Peel, to Steel |
| Holding Power | PSTC-7, to Steel, 0.5 × 0.5 inch, 1 kg Load, at 49° C. |
| Softening Point | ASTM E28, 5° C./min |

Compared with the existing polystyrene-polyisoprene radial block copolymers, as described above, the block copolymer containing a tapered block exhibits more excellent properties such as high tackiness and better processibility caused by its lower melt viscosity in the same molecular weight range. According to the present invention, the content of the tapered block is controllable by adding isoprene before the styrene monomer is completely consumed in the reaction. More specifically, the content of the tapered block in the polystyrene-polyisoprene radial block copolymer can be regulated by varying the reaction temperature and the reaction time. In particular, when the content of the tapered block in the polystyrene-polyisoprene radial bock copolymer is less than 20 wt. %, the radial block copolymer containing a tapered block exhibits excellencies in the aspect of properties and processability and is useful as a base resin for adhesive compositions.

What is claimed is:

1. A radial multi-block copolymer including a tapered block, the radial multi-block copolymer comprising a polystyrene block, a poly(isoprene-styrene)tapered block, a polyisoprene block, and a polybutadiene block, the radial multi-block copolymer being represented by the following formula 1 and having a weight average molecular weight of 200,000 to 500,000:

$$(pA-pT-pB)m-X-n(pC-pB-pT-pA) \quad \text{Formula 1:}$$

wherein pA is the polystyrene block; pT is the poly(isoprene-styrene)tapered block; pB is the polyisoprene block; pC is the polybutadiene block; X is the residue of a multi-functional coupling agent used in preparation of the radial multi-block copolymer; m and n are integers equal to or greater than 1, representing the number of branches associated with X; and wherein the content of pT=the content of pTA+the content of pTB; the content of pA+the content of pTA=10 to 50 wt. % of the radial multi-block copolymer; 0.1<the content of pC≦10 wt % of the radial multi-block copolymer; and 0.002≦the content of pT≦20 wt. % of the radial multi-block copolymer; wherein pTA is the pA component of pT, and pTB is the pB component of pT.

2. The radial multi-block copolymer including a tapered block as claimed in claim 1, wherein the content of pA+pTA in the radial multi-block copolymer is in the range of 15 to 40 wt. %.

3. The radial multi-block copolymer including a tapered block as claimed in claim 1, wherein the content of the pC block in the radial multi-block copolymer satisfies 0.1≦pC≦5 wt. %.

4. The radial multi-block copolymer including a tapered block as claimed in claim 1, wherein the content of the pT block in the radial multi-block copolymer satisfies 0.002≦pT≦10 wt. %.

5. A composition containing the radial multi-block copolymer including a tapered block as claimed in claim 1, wherein the coupling rate of the radial multi-block copolymer is at least 50 %.

6. The radial multi-block copolymer including a tapered block as claimed in claim 5, wherein the coupling rate of the radial multi-block copolymer is in the range of 50 to 90 %.

7. The radial multi-block copolymer including a tapered block as claimed in claim 1, wherein the pA has a weight average molecular weight of 5,000 to 40,000.

8. The radial multi-block copolymer including a tapered block as claimed in claim 7, wherein the pA has a weight average molecular weight of 8,000 to 20,000.

9. A pressure-sensitive adhesive composition comprising the radial multi-block copolymer of claim 1 and a tackifier.

10. An adhesive composition comprising the radial multi-block copolymer of claim 1 and a tackifier.

11. An adhesive composition comprising the radial multi-block copolymer of claim 1.

12. The adhesive composition as claimed in claim 10, wherein the adhesive composition is of a hot melt type or a solvent type.

13. The adhesive composition as claimed in claim 11, wherein the adhesive composition is of a hot melt type or a solvent type.

14. An adhesive tape using an adhesive composition comprising the radial multi-block copolymer of claim 1 and a tackifier as coated on a paper or a polymer film.

15. An adhesive label using an adhesive composition comprising the radial multi-block copolymer of claim 1 and a tackifier as coated on a paper or a polymer film.

16. An adhesive tape using an adhesive composition comprising the radial multi-block copolymer of claim 1 as coated on a paper or a polymer film.

17. An adhesive label using an adhesive composition comprising the radial multi-block copolymer of claim 1 as coated on a paper or a polymer film.

18. The radial multi-block copolymer including a tapered block as claimed in claim 1, wherein the coupling agent includes at least one selected from the group consisting of silicon tetrachloride, tetramethoxysilane, and tetraethoxysilane.

* * * * *